US009295937B2

(12) United States Patent
Shinoda et al.

(10) Patent No.: US 9,295,937 B2
(45) Date of Patent: *Mar. 29, 2016

(54) VEHICLE ATMOSPHERE PURIFYING APPARATUS

(75) Inventors: Yoshihisa Shinoda, Susono (JP); Kazuhiro Sugimoto, Susono (JP); Hiroaki Katsumata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 36 days.

This patent is subject to a terminal disclaimer.

(21) Appl. No.: 14/130,408

(22) PCT Filed: Jul. 28, 2011

(86) PCT No.: PCT/JP2011/067313
§ 371 (c)(1),
(2), (4) Date: Dec. 31, 2013

(87) PCT Pub. No.: WO2013/014792
PCT Pub. Date: Jan. 31, 2013

(65) Prior Publication Data
US 2014/0134056 A1     May 15, 2014

(51) Int. Cl.
*B01D 53/04*     (2006.01)
*B01D 53/66*     (2006.01)

(52) U.S. Cl.
CPC .............. *B01D 53/04* (2013.01); *B01D 53/66* (2013.01); *B01D 2257/106* (2013.01); *B01D 2257/80* (2013.01); *B01D 2258/06* (2013.01);
(Continued)

(58) Field of Classification Search
CPC .................. F24F 3/16; F24F 2003/165; F24F 2003/1625; B01D 53/04; B01D 53/66

USPC .................................................. 422/120, 122
See application file for complete search history.

(56) References Cited

U.S. PATENT DOCUMENTS 6,199,397 B1     3/2001 Khelifa et al.
6,280,691 B1 *   8/2001 Homeyer et al. ............. 422/122
(Continued)

FOREIGN PATENT DOCUMENTS

CN      1213984 A      4/1999
DE      35 17 481 A1   11/1986
(Continued)

OTHER PUBLICATIONS

U.S. Appl. No. 14/360,370, filed May 23, 2014, Shinoda et al.
(Continued)

*Primary Examiner* — Regina M Yoo
(74) *Attorney, Agent, or Firm* — Oblon, McClelland, Maier & Neustadt, L.L.P.

(57)     ABSTRACT

A vehicle atmosphere purifying apparatus including an ozone purifying body, in which activated charcoal is coated on a core portion of radiators and a condenser, respectively. If water adheres to pores of activated charcoal or areas surrounding the pores, ozone becomes hard to enter mesopores and micropores. Even if ozone enters, an electron becomes hard to donate from the activated charcoal to the ozone. Consequently, the performance of the activated charcoal decreases while water is adhered thereto. When an amount of moisture adhered to activated charcoal is equal to or greater than a predetermined amount, moisture desorption control is executed that forcibly heats the activated charcoal to a high temperature to desorb the moisture therefrom.

5 Claims, 9 Drawing Sheets

(52) U.S. Cl.
CPC ........... *B01D2259/40096* (2013.01); *B01D 2259/40098* (2013.01); *B01D 2259/4558* (2013.01); *B01D 2259/4566* (2013.01)

(56) References Cited

U.S. PATENT DOCUMENTS

| | | | |
|---|---|---|---|
| 6,616,903 B2 * | 9/2003 | Poles et al. | 423/210 |
| 2001/0019707 A1 | 9/2001 | Okayama et al. | |
| 2001/0025484 A1 | 10/2001 | Ueno et al. | |
| 2003/0056496 A1 | 3/2003 | Ueno et al. | |
| 2009/0013686 A1 * | 1/2009 | Yaguchi et al. | 60/597 |
| 2010/0067560 A1 | 3/2010 | Kouda et al. | |
| 2010/0254868 A1 * | 10/2010 | Obee et al. | 423/210 |
| 2014/0134056 A1 | 5/2014 | Shinoda et al. | |

FOREIGN PATENT DOCUMENTS

| | | |
|---|---|---|
| DE | 196 24 216 A1 | 1/1998 |
| DE | 198 06 880 A1 | 8/1999 |
| DE | 199 55 253 A1 | 6/2001 |
| FR | 2 848 500 A1 | 6/2004 |
| JP | 59-80739 U | 5/1984 |
| JP | 11-507289 | 6/1999 |
| JP | 2000-107545 | 4/2000 |
| JP | 2001-323811 A | 11/2001 |
| JP | 2001-347829 A | 12/2001 |
| JP | 2003-155924 A | 5/2003 |
| JP | 2004-321920 A | 11/2004 |
| JP | 2010-848 A | 1/2010 |
| JP | 2010-29816 A | 2/2010 |
| JP | 2010-71080 A | 4/2010 |
| WO | WO 96/22150 A1 | 7/1996 |
| WO | WO 00/69555 A1 | 11/2000 |
| WO | WO 2012/127645 A1 | 9/2012 |

OTHER PUBLICATIONS

U.S. Appl. No. 14/130,408, Dec. 31, 2013, Shinoda et al.
International Search Report issued Oct. 25, 2011 in PCT/JP2011/067313.
International Search Report issued Oct. 25, 2011, in PCT/JP11/067313 filed Jul. 28, 2011.

* cited by examiner

100 :
CALCULATE ABSORBED
MOISTURE AMOUNT

110 :
IS THE ABSORBED MOISTURE
AMOUNT EQUAL TO OR GREATER THAN
A PREDETERMINED AMOUNT?

120 :
PERFORM THE OPERATIONS
(1) TO (6)

Fr    Rr (A) NORMAL (B) BACK FLOW (UNDER MOISTURE
DESORPTION CONTROL)

VEHICLE ATMOSPHERE PURIFYING APPARATUS

TECHNICAL FIELD

The present invention relates to a vehicle atmosphere purifying apparatus, and more particularly to a vehicle atmosphere purifying apparatus that can purify ozone contained in atmospheric air.

BACKGROUND ART

It is known that, with respect to purification of atmospheric air utilizing activated charcoal, the adsorption performance of the activated charcoal decreases as the result of long-term use, and conventionally various countermeasures are taken to regenerate such activated charcoal. For example, Patent Literature 1 discloses an in-vehicle air conditioning apparatus that includes an activated charcoal filter that adsorbs odorous components and harmful components in atmospheric air supplied into a vehicle, a heating apparatus that physically contacts the filter, and a blower that generates an air flow for cleaning. In this in-vehicle air conditioning apparatus, the heating apparatus is activated while an air flow for cleaning that is generated by operation of the blower passes through the filter. Since it is thereby possible to heat activated charcoal and air inside the filter, the aforementioned harmful components and the like that were adsorbed on the filter can be desorbed to regenerate the activated charcoal.

Further, Patent Literature 2 discloses an atmosphere purifying apparatus in which a metal oxide such as manganese dioxide is carried on a vehicle component such as a radiator. The radiator is installed at a location at which a flow path of atmospheric air is formed while the vehicle is running, and manganese dioxide is a substance that has a function that purifies ozone included in atmospheric air by converting the ozone into another substance such as oxygen. Therefore, according to the atmosphere purifying apparatus disclosed in Patent Literature 2, ozone in atmospheric air can be directly purified while the vehicle is running. A system that is equipped with this function is, in particular, referred to as a "direct ozone reduction (DOR) system".

CITATION LIST

Patent Literature

Patent Literature 1: Japanese Patent Laid-Open No. 2000-107545
Patent Literature 2: National Publication of International Patent Application No. 1999-507289
Patent Literature 3: International Publication No. WO 00/69555

SUMMARY OF INVENTION

It is known that the ability to purify ozone is found not only in metal oxides such as manganese dioxide, but also in porous materials such as the aforementioned activated charcoal and zeolite. However, the present inventors discovered that the ozone purifying performance of a porous material decreases not only due to long-term use as described above, but also due to adsorption of water. Therefore, when using a porous material as an ozone purifying body, it is necessary to separately institute a countermeasure to suppress a decrease in the ozone purifying performance due to water adsorption or to regenerate the ozone purifying performance.

The present invention has been conceived in view of the above described problem, and an object of the present invention is to provide a DOR system that enables suppression of a decrease in ozone purifying performance due to water adsorption and restoration of the ozone purifying performance.

Means for Solving the Problem

To achieve the above mentioned purpose, a first aspect of the present invention is a vehicle atmosphere purifying apparatus comprising:
a vehicle component that is arranged at a location at which a flow path of atmospheric air is formed while a vehicle is running;
an ozone purifying body that is provided on the vehicle component and purifies ozone; and
heating means that heats the ozone purifying body so that a temperature of the ozone purifying body becomes equal to or greater than a predetermined temperature at which moisture that is adsorbed on the ozone purifying body evaporates.

A second aspect of the present invention is the vehicle atmosphere purifying apparatus according to the first aspect, further comprising:
a heat source apparatus that is mounted for a purpose of vehicle driving and/or in-vehicle air conditioning;
wherein the heating means heats the ozone purifying body utilizing heat that is generated by the heat source apparatus.

A third aspect of the present invention is the vehicle atmosphere purifying apparatus according to the second aspect, wherein
the vehicle component has a coolant circulation channel through which coolant that circulates inside the heat source apparatus flows; and
the heating means heats the ozone purifying body by causing coolant to flow through the coolant circulation channel after the coolant undergoes heat exchange with the heat source apparatus.

A forth aspect of the present invention is the vehicle atmosphere purifying apparatus according to the third aspect, further comprising:
a heat recovery apparatus that recovers heat that is generated by the heat source apparatus; and
a heat recovery channel through which coolant that circulates inside the heat recovery apparatus flows;
wherein the heating means heats the ozone purifying body by connecting the coolant circulation channel and the heat recovery channel to cause coolant to flow through the coolant circulation channel after the coolant undergoes heat exchange with the heat source apparatus.

A fifth aspect of the present invention is the vehicle atmosphere purifying apparatus according to any one of the second to the forth aspects, further comprising:
a rotary fan that is provided between the vehicle component and the heat source apparatus;
wherein the heating means heats the ozone purifying body by rotating the rotary fan so that air on the heat source apparatus side flows to the vehicle component side.

A sixth aspect of the present invention is the vehicle atmosphere purifying apparatus according to the fifth aspect, further comprising:
warming-up condition determination means that determines whether or not a predetermined warming-up condition relating to the heat source apparatus is established;
wherein, if it is determined that the predetermined warming-up condition is established, the heating means prohibits a flow of coolant to the coolant circulation channel.

A seventh aspect of the present invention is the vehicle atmosphere purifying apparatus according to any one of the forth to the sixth aspects, further comprising:

stop condition determination means that determines whether or not a predetermined stop condition relating to the vehicle is established;

wherein, if it is determined that the predetermined stop condition is established, the heating means heats the ozone purifying body.

An eighth aspect of the present invention is the vehicle atmosphere purifying apparatus according to any one of the first to the seventh aspects, wherein in a case where a moisture amount that is adsorbed on the ozone purifying body is equal to or greater than a preset amount, the heating means heats the ozone purifying body.

A ninth aspect of the present invention is the vehicle atmosphere purifying apparatus according to the eighth aspect, wherein the moisture amount is calculated based on at least one of a traveled distance of the vehicle, a vehicle driving history of the vehicle, a heating history of the ozone purifying body, an ambient temperature of the ozone purifying body, an ambient humidity of the ozone purifying body, weather information of the driving region, air temperature information of the driving region, and humidity information of the driving region.

Advantageous Effects of Invention

According to the first invention, an ozone purifying body can be heated by heating means so that the temperature thereof becomes equal to or higher than a predetermined temperature at which moisture that is adsorbed on the ozone purifying body evaporates. Accordingly, a decrease in the ozone purifying performance of the ozone purifying body can be suppressed and the ozone purifying performance can be restored.

According to the second invention, the aforementioned ozone purifying body can be heated utilizing heat that is generated by a heat source apparatus. The heat source apparatus is mounted for the purpose of vehicle driving and/or in-vehicle air conditioning. Accordingly, the ozone purifying body can be heated to a temperature that is equal to or higher than the aforementioned predetermined temperature by utilizing an existing vehicle-mounted apparatus.

According to the third invention, the ozone purifying body can be heated by causing coolant to flow through a coolant circulation channel after the coolant undergoes heat exchange with the heat source apparatus. Further, according to the fourth invention, the ozone purifying body can be heated by causing coolant to flow through a coolant circulation channel after the coolant undergoes heat exchange with a heat recovery apparatus. Therefore, according to these inventions, the ozone purifying body can be heated to a temperature that is equal to or higher than the aforementioned predetermined temperature by utilizing coolant that has a high temperature after undergoing heat exchange.

According to the fifth invention, the ozone purifying body can be heated by rotating a rotary fan so that air on the heat source apparatus side flows to a vehicle component side. Thus, the ozone purifying body can be heated to a temperature equal to or higher than the aforementioned predetermined temperature by utilizing air whose temperature increased to a high temperature in the vicinity of the heat source apparatus.

According to the sixth invention, the flow of coolant to the coolant circulation channel can be prohibited when it is determined that a predetermined warming-up condition is established. Therefore, when the aforementioned predetermined warming-up condition is established, it is possible to heat the ozone purifying body by utilizing air whose temperature increased to a high temperature in the vicinity of the heat source apparatus by rotating the rotary fan. On the other hand, when the aforementioned predetermined warming-up condition is not established, it is possible to heat the ozone purifying body by simultaneously utilizing rotation of the rotary fan and the high-temperature coolant that has undergone heat exchange.

According to the seventh invention, the ozone purifying body can be heated while the vehicle is stopped. Therefore, even in a case where heating is insufficient while the vehicle is operating, the insufficient heating can be compensated for by increasing the temperature of the ozone purifying body by heating the ozone purifying body while the vehicle is stopped.

According to the eighth invention, when a moisture amount that is adsorbed on the ozone purifying body is equal to or greater than a preset amount, the ozone purifying body can be heated. Therefore, heating of the ozone purifying body can be efficiently performed.

According to the ninth invention, a moisture amount that is adsorbed on the ozone purifying body can be calculated based on at least one of a traveled distance of the vehicle, a vehicle driving history, a heating history of the ozone purifying body, an ambient temperature of the ozone purifying body, an ambient humidity of the ozone purifying body, weather information of the driving region, air temperature information of the driving region, and humidity information of the driving region. Therefore, since the aforementioned moisture amount can be calculated with high accuracy, efficient heating of the ozone purifying body can be promoted.

DESCRIPTION OF EMBODIMENTS

Embodiment 1

Configuration of Vehicle Atmosphere Purifying Apparatus

Figure 1:
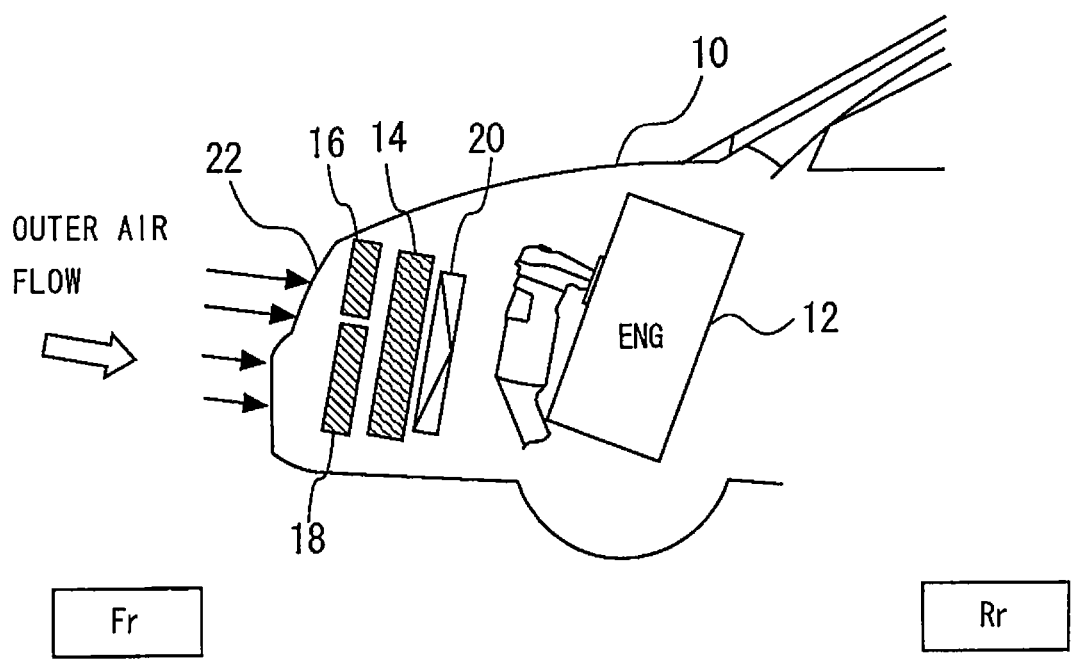
FIG. 1 is a view that illustrates the configuration of a vehicle in which an atmosphere purifying apparatus according to the first embodiment is mounted.
Figure 1:
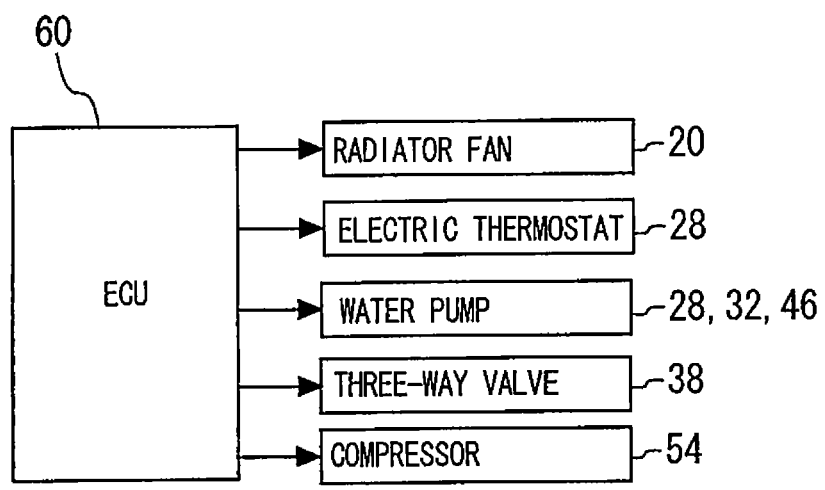

First, Embodiment 1 of the present invention will be described referring to FIG. 1 to FIG. 6. FIG. 1 is a view that illustrates the configuration of a vehicle in which an atmosphere purifying apparatus according to the present embodiment is mounted. A vehicle 10 shown in FIG. 1 is a hybrid vehicle that includes an internal combustion engine 12 and an electric motor (described later) as power apparatuses. HC and NOx are included in exhaust gas that is discharged from the internal combustion engine 12. Ozone is generated by a photochemical reaction between HC and NOx as reactants. Therefore, when the atmosphere purifying apparatus is mounted on the vehicle 10, ozone is purified while the vehicle 10 is running. And thus, the damage to the environment caused due to the vehicle 10 can be reduced.

In the vehicle 10, a radiator 14 that cools cooling water that circulates through the internal combustion engine 12 is arranged in front of the internal combustion engine 12. A radiator 16 for hybrid use that cools cooling water that circulates through an inverter (described later) that supplies power to the electric motor, and a condenser 18 of an air conditioning system are arranged in front of the radiator 14. A radiator fan 20 is installed at the rear of the radiator 14 so as to cover the entire rear face thereof. The radiator fan 20 is adapted so as to be capable of rotating in a forward direction and a reverse direction. When the radiator fan 20 is rotated in the forward direction, air at the rear of the radiator 14 is drawn out to the internal combustion engine 12 side, and when the radiator fan 20 is rotated in the reverse direction, air at the front of the internal combustion engine 12 is drawn to the radiator 14 side.

Figure 2:
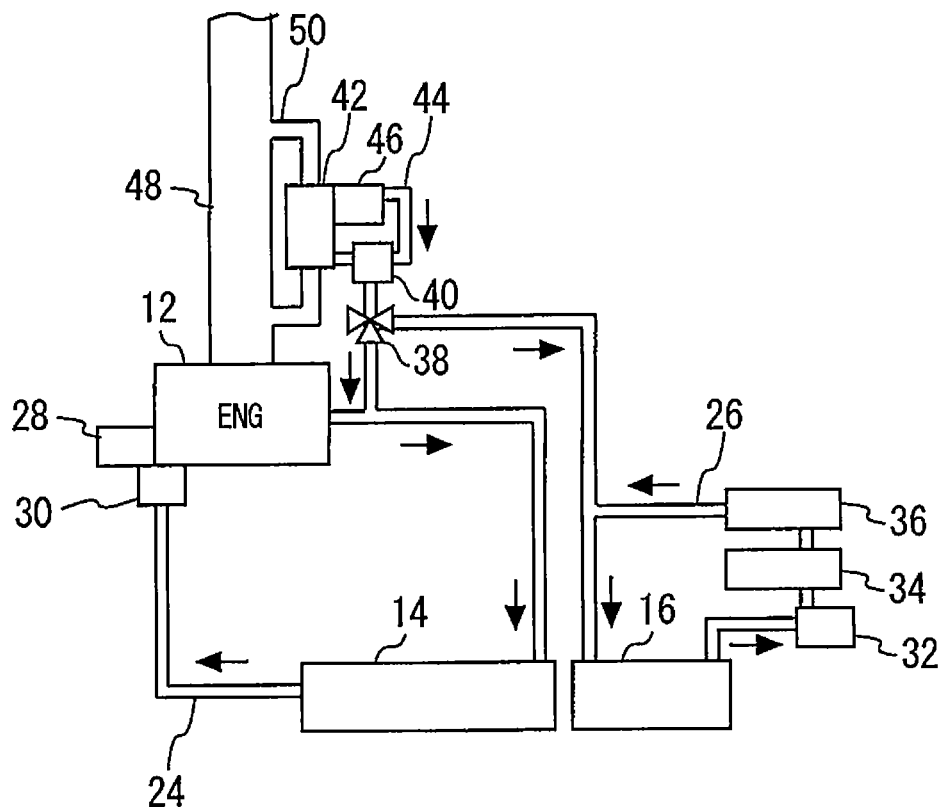
FIG. 2 is a schematic drawing of the cooling water circulation system mounted in the vehicle 10.

The feeding of water to the radiators 14 and 16 is performed by a cooling water circulation system. The cooling water circulation system will now be described referring to FIG. 2. FIG. 2 is a schematic drawing of the cooling water circulation system mounted in the vehicle 10. As shown in FIG. 2, cooling water circulation circuits 24 and 26 are mounted in the vehicle 10. The cooling water circulation circuit 24 is provided for the purpose of cooling the internal combustion engine 12. The cooling water circulation circuit 26 is provided for the purpose of cooling an inverter 34.

In addition to the radiator 14, a water pump 28 and an electric thermostat 30 are provided in the cooling water circulation circuit 24. Feeding of water to the radiator 14 is allowed or stopped in accordance with whether the electric thermostat 30 is open or closed. More specifically, during driving of the water pump 28, if the cooling water temperature becomes equal to or higher than a predetermined temperature, the electric thermostat 30 is opened to allow water to flow to the radiator 14, while if the cooling water temperature is less than the predetermined temperature, the electric thermostat 30 is closed to stop water from flowing to the radiator 14.

In addition to the radiator 16 and inverter 34, a water pump 32 and an electric motor 36 are provided in the cooling water circulation circuit 26. Feeding of water to the radiator 16 is performed by the water pump 32.

The cooling water circulation circuits 24 and 26 are connected to a heat storage tank 40 through a three-way valve 38. The three-way valve 38 is configured so as to connect the heat storage tank 40 with the cooling water circulation circuits 24 and 26 or to disconnect the heat storage tank 40 from the cooling water circulation circuits 24 and 26. When the three-way valve 38 is activated, cooling water flows from inside the heat storage tank 40 to the cooling water circulation circuit 24 and the cooling water circulation circuit 26. The heat storage tank 40 is a tank that temporarily stores high-temperature cooling water, and constitutes one part of an exhaust heat recovery system.

The exhaust heat recovery system includes, in addition to the heat storage tank 40, an exhaust heat recovery device 42, a heat storage circuit 44 and a water pump 46. The exhaust heat recovery device 42 is provided in a bypass passage 50 that bypasses a part of an exhaust passage 48 of the internal combustion engine 12, and is constructed so that exhaust gas of the internal combustion engine 12 and cooling water pass through the inside thereof. The exhaust heat recovery device 42 recovers exhaust heat of the internal combustion engine 12 by heat exchange between exhaust gas and cooling water that flow therethrough. The water pump 46 is provided to cause cooling water to circulate around the inside of the heat storage circuit 44.

Figure 3:
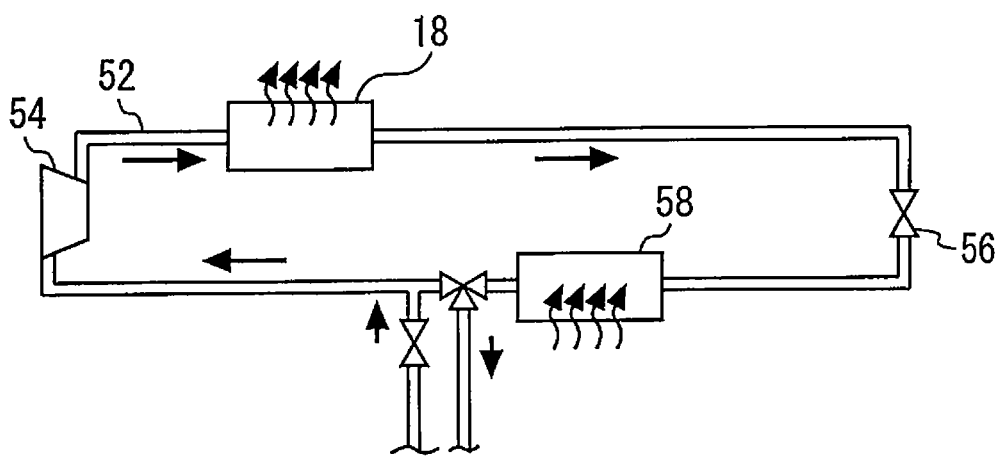
FIG. 3 is a schematic diagram illustrating the air conditioning system that is mounted in the vehicle 10.

Returning to FIG. 1, the condenser 18 of the air conditioning system is arranged at the front of the radiator 14. An outline of the air conditioning system will now be described referring to FIG. 3. FIG. 3 is a schematic diagram illustrating the air conditioning system that is mounted in the vehicle 10. This air conditioning system performs air conditioning for the inside of the cabin of the vehicle 10, and includes a coolant circulation circuit 52 that circulates a coolant such as, for example, carbon dioxide.

A compressor 54, an expansion valve 56 and an evaporator 58 are provided in the coolant circulation circuit 52 in addition to the condenser 18. The compressor 54 compresses the coolant. The condenser 18 has a function that condenses the coolant that was compressed by the compressor 54. The expansion valve 56 decompresses the coolant that was condensed by the condenser 18, by throttling the flow of the coolant to cause the coolant to expand. The evaporator 58 evaporates coolant that was decompressed by the expansion valve 56.

As shown by arrows in FIG. 3, the coolant inside the coolant circulation circuit 52 circulates in the order of the compressor 54, the condenser 18, the expansion valve 56 and the evaporator 58. The coolant is compressed when passing through the compressor 54 and enters a high-temperature and high-pressure state, and thereafter enters a low-temperature and high-pressure state when passing through the condenser 18. Further, the coolant is placed in a low-temperature and low-pressure state by the expansion valve 56, and is placed in a high-temperature and low-pressure state by the evaporator 58. The coolant that was placed in a high-temperature and low-pressure state by the evaporator 58 flows through the coolant circulation circuit 52 and is introduced into the compressor 54.

The configuration of the vehicle 10 will now be described with reference again to FIG. 1. An ECU (electronic control unit) 60 is mounted as a control apparatus in the vehicle 10. The above described radiator fan 20, electric thermostat 30, water pumps 28, 32 and 46, three-way valve 38 and compressor 54 and the like are connected to the output side of the ECU 60.

As shown by arrows in FIG. 1, when the vehicle 10 is running, atmospheric air is drawn into the vehicle 10 through a bumper grille 22 at the front face of the vehicle 10, and passes by the radiator 16 and condenser 18 and the radiator 14 in that order and discharged in the rearward direction. That is, while the vehicle 10 is running, running wind comes in contact with the radiators 14 and 16 and the condenser 18. According to the present embodiment, activated charcoal as an ozone purifying body is coated on core portions of the radiators 14 and 16 and the condenser 18, respectively.

[Activated Charcoal as Ozone Purifying Body, and Issues Associated Therewith]

Since activated charcoal is capable purifying ozone to a degree that is comparable with that of metal oxides such as manganese dioxide and can also be obtained at low cost, it is regarded as a promising substitute for metal oxides for ozone purification. Further, since activated charcoal can purify ozone in a normal temperature (25° C.) region and not just in a temperature region of water that flows to an engine radiator (normally 80 to 100° C.) and a temperature region of water that flows to a radiator for hybrid use (normally 50 to 70° C.), activated charcoal is useful in comparison to the aforementioned metal oxides which require a high purification temperature of approximately 80° C. or more.

Figure 4:
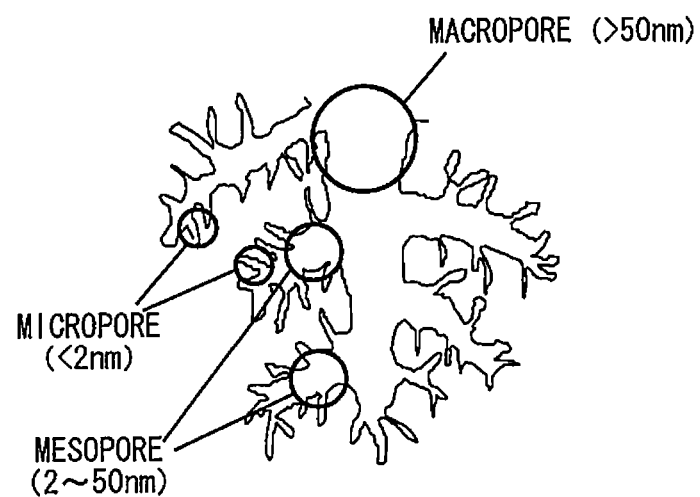
FIG. 4 is a view that illustrates the internal structure of activated charcoal.

FIG. 4 is a view that illustrates the internal structure of activated charcoal. As shown in FIG. 4, activated charcoal has a countless number of pores that are formed from the surface towards the inside thereof. These pores are classified according to their size into macropores (>50 nm), mesopores (2 to 50 nm) and micropores (<2 nm). Decomposition of ozone by activated charcoal occurs when ozone enters the mesopores and micropores among the aforementioned kinds of pores. More specifically, ozone that enters the mesopores and micropores accepts an electron donated by the activated charcoal around the ozone and is converted into oxygen and activated oxygen ($O_3 \rightarrow O_2 + O^*$).

Figure 5:
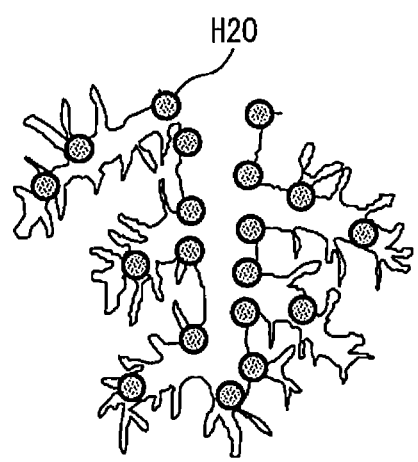
FIG. 5 is a view that illustrates a state in which water is adsorbed on pores of the activated charcoal shown in FIG. 4.

Although the specific surface area of activated charcoal is large, activated charcoal also exhibits a high degree of hydrophobicity. Thus, it may also be considered that it is difficult for activated charcoal to be affected by water adsorption. However, there are cases where water (water molecules) included in the atmosphere is adsorbed on the aforementioned pores. In such case, sites for ozone decomposition of the activated charcoal are blocked by the adsorbed water. FIG. 5 schematically illustrates a state in which water is adsorbed on pores of the activated charcoal shown in FIG. 4. As shown in FIG. 5, when water is adsorbed on the pores and surrounding areas of activated charcoal, it is difficult for ozone to enter the mesopores and micropores. Further, even if ozone enters the mesopores and micropores, it is difficult for donation of electrons from the activated charcoal to the ozone to occur. Accordingly, the ozone purifying performance of the activated charcoal decreases while water is adsorbed thereon.

Next, a description with respect to a decrease in ozone purifying performance that is caused by water will be made with reference to FIG. 6 and FIG. 7. FIGS. 6(A) and 6(B) are views that illustrate, with respect to a case where nitrogen gas of differing temperatures (25° C., 50° C., and 75° C.) is blown through a test piece of activated charcoal (initial bed temperature 25° C.), variations over time in the bed temperature (FIG. 6(A)) and variations over time in water vapor behavior on the downstream side of the test piece (FIG. 6(B)). Note that, as shown in FIGS. 6(A) and 6(B), nitrogen gas was blown through the test piece from a time point that was approximately 30 seconds after the start of the test.

As shown in FIG. 6(A), when the nitrogen gas with a temperature of 25° C. was blown through, there was almost no change in the bed temperature of the test piece from the initial bed temperature. On the other hand, when the nitrogen gas with a temperature of 50° C. or 75° C. was blown through, the bed temperature of the test piece increased so as to approach the temperature of the blown gas. Further, as shown in FIG. 6(B), when the nitrogen gas with a temperature of 25° C. was blown through, the dew-point temperature increased slightly approximately 80 seconds after the start of the test, and thereafter gradually decreased. In contrast, when the nitrogen gas with a temperature of 50° C. or 75° C. was blown through, the dew-point temperature reached a peak approximately 80 to 90 seconds after the start of the test, and thereafter decreased. It was thus found that water is adsorbed on activated charcoal, and if nitrogen gas of a higher temperature than the bed temperature is blown through the activated charcoal, a large amount of water vapor is released on the downstream side of the activated charcoal.

Figure 7:
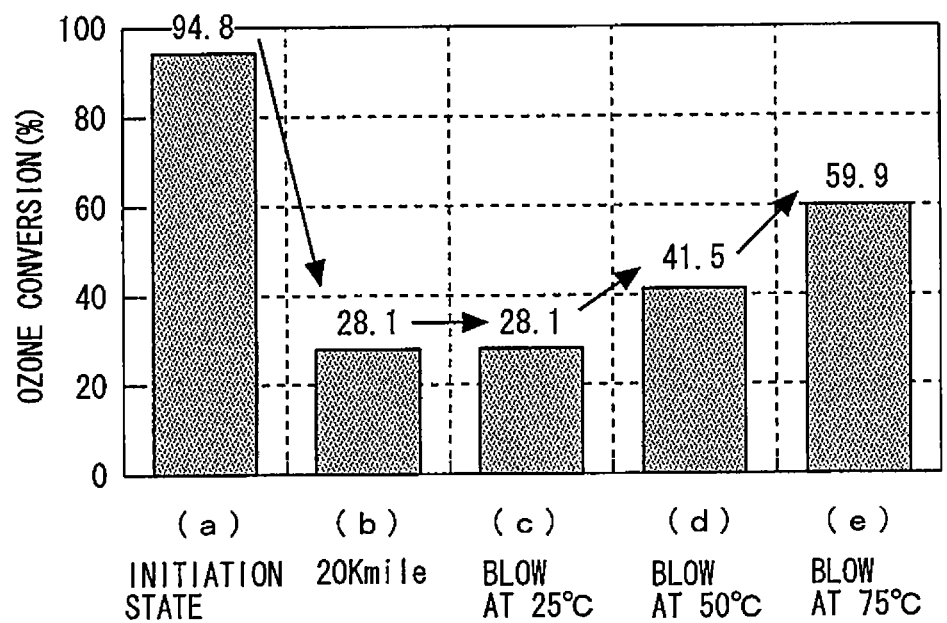
FIG. 7 is a view that illustrates results of a moisture impact study with respect to ozone conversion rates of activated charcoal.

FIG. 7 is a view that illustrates results of a moisture impact study with respect to ozone conversion rates of activated charcoal. Reference character (a) in FIG. 7 denotes an ozone conversion rate in the initial state of the activated charcoal, and reference character (b) in FIG. 7 denotes an ozone conversion rate of activated charcoal after an ozone purification test that was equivalent to 20,000 miles (bed temperature at the time of the test was 25° C.). Further, reference characters (c) to (e) in FIG. 7 respectively denote ozone conversion rates after nitrogen gas of different temperatures was blown through the activated charcoal after the ozone purification test. Note that, the ozone conversion rate of the activated charcoal was determined using a ratio of the concentrations of ozone before and after the activated charcoal in a case where gas containing ozone of a certain concentration was blown through the activated charcoal from the front to the rear thereof.

As shown by the results denoted by (a) and (b) in FIG. 7, the ozone conversion rate of the activated charcoal was 94.8% in the initial state and decreased to 28.1% after the ozone purification test. Further, as shown by the result denoted by (c) in FIG. 7, even when nitrogen gas with a temperature of 25° C. was blown therethrough in the state after the ozone purification test, the ozone conversion rate of the activated charcoal did not change. However, when nitrogen gas with a temperature of 50° C. was blown therethrough, the ozone conversion rate of the activated charcoal rose to 41.5% ((d) in FIG. 7). Further, when nitrogen gas with a temperature of 75° C. was blown therethrough, the ozone conversion rate of the activated charcoal rose further to 59.9% ((e) in FIG. 7). It was thus found that the ozone purifying performance of activated charcoal recovers when high-temperature nitrogen gas is blown therethrough.

Figure 6:
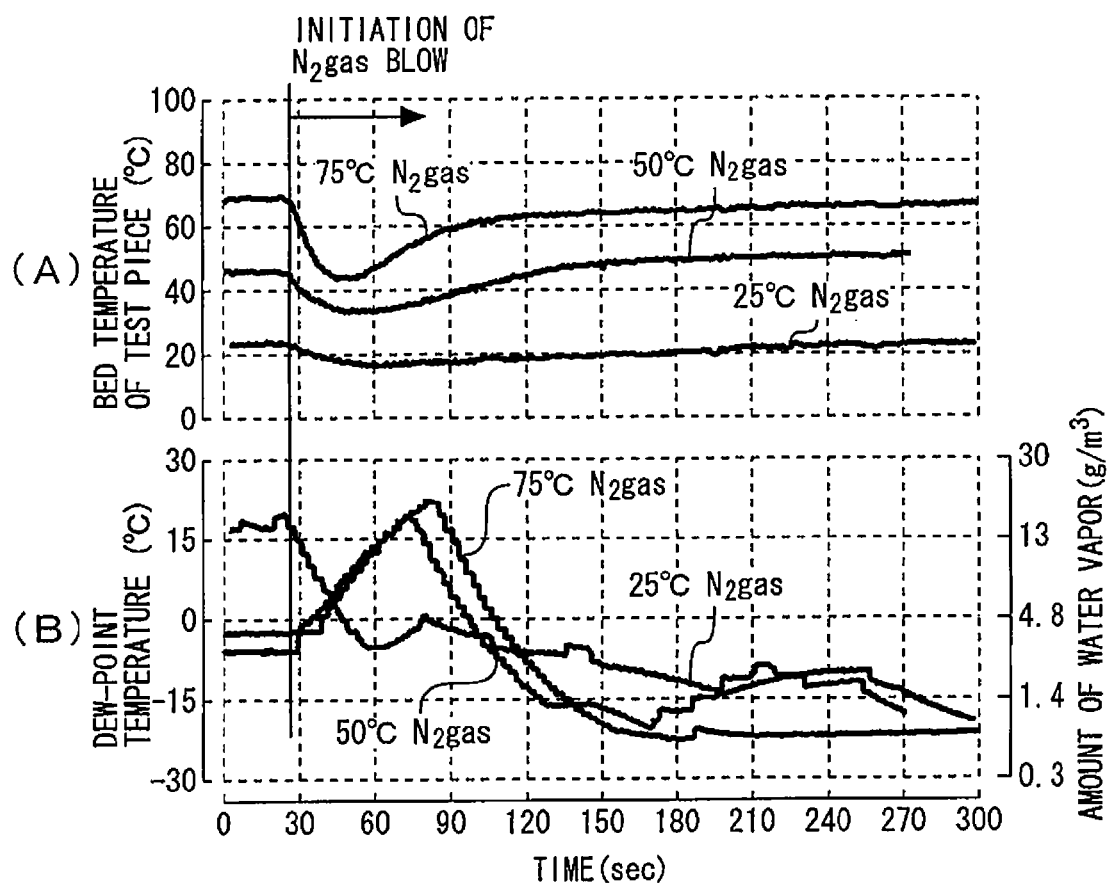
FIG. 6 are views that illustrate, with respect to a case where nitrogen gas of differing temperatures (25° C., 50° C., and 75° C.) is blown through a test piece of activated charcoal (initial bed temperature 25° C.), variations over time in the bed temperature (FIG. 6(A)) and variations over time in water vapor behavior on the downstream side of the test piece (FIG. 6(B)).

Thus, on the basis of FIGS. 6 and 7 it is found that, to restore the ozone purifying performance of activated charcoal, it is sufficient to increase temperature of the activated charcoal to a high temperature to desorb moisture therefrom. In this connection, as described above, feeding of water to the radiator 14 is performed by opening the electric thermostat 30 when the cooling water temperature is equal to or greater than a predetermined temperature. Therefore, by setting the aforementioned predetermined temperature in advance to a low temperature, it is possible to maintain the activated charcoal that is coated on the radiator 14 at a high temperature at all times.

However, in recent years there is an increasing trend towards lowering the fuel consumption of vehicles, and for this purpose it is necessary to suppress to a minimum the frequency at which water is fed to the engine radiator to thereby decrease cooling loss of the internal combustion engine. In addition, for hybrid vehicles such as the vehicle 10, the frequency of cooling the engine radiator tends to be lower since the engine load is reduced. In view of these factors, it can be said that, with respect to the vehicle 10, in particular, the environment is one in which it is difficult for the temperature of the activated charcoal that is coated on the radiator 14 to become a high temperature and it is easy for a state in which water is adsorbed thereon to continue for an extended period.

In an environment in which a state in which water is adsorbed on the activated charcoal has continued, the possibility that donation of electrons from the activated charcoal to the water side will occur increases. In such a case, the activated charcoal undergoes a hydrolysis reaction and sites for ozone decomposition disappear. Accordingly, when a state in which water is adsorbed on activated charcoal continues, the ozone purifying performance of the activated charcoal decreases to a state in which restoration thereof is not possible.

Therefore, in the present embodiment a configuration is adopted in which, when a moisture amount adsorbed on activated charcoal (hereunder, referred to as "adsorbed moisture amount") is equal to or greater than a predetermined amount, moisture desorption control is executed that forcibly increases the temperature of the activated charcoal to a high temperature to desorb moisture. Although the main object of the moisture desorption control is to make the temperature of the activated charcoal of the radiator 14 a high temperature, it is assumed that the moisture desorption control is executed to also simultaneously make the temperature of the activated charcoal of the radiator 16 and the condenser 18 a high temperature.

[Moisture Desorption Control]

The moisture desorption control will now be described in detail. First, at least one of the following (1) to (3) operations is executed with respect to the radiator 14.

(1) The electric thermostat 30 is forcibly opened while forcibly driving the water pump 28.

(2) The three-way valve 38 is forcibly opened while forcibly driving the water pump 46.

(3) The compressor 54 is forcibly driven.

If the operation of (1) above is executed, cooling water with a temperature that is high to a certain extent is fed into the radiator 14, and thus the temperature of the activated charcoal thereof can be directly increased to a high temperature. If the operation of (2) above is executed, the heat storage tank 40 and the cooling water circulation circuit 24 are connected to allow high-temperature cooling water in the heat storage tank 40 to flow into the radiator 14, and thus the temperature of the activated charcoal thereof can be directly increased to a high temperature. Further, if the operation of (3) above is executed, since the condenser 18 becomes a high temperature, the temperature of the activated charcoal of the radiator 14 to the rear thereof can be indirectly increased to a high temperature. Accordingly, by executing at least one of the above described operations (1) to (3), the temperature of the activated charcoal of the radiator 14 can be increased to a high temperature to desorb moisture therefrom.

Next, the following operation (4) or (5) is executed with respect to the radiator 16.

(4) The water pump 32 is forcibly driven.

(5) The three-way valve 38 is forcibly opened while forcibly driving the water pump 46.

If the operation of (4) above is executed, cooling water is fed into the radiator 16, and thus the temperature of the activated charcoal thereof can be directly increased to a high temperature. If the operation of (5) above is executed, the heat storage tank 40 and the cooling water circulation circuit 26 are connected to allow high-temperature cooling water in the heat storage tank 40 to flow into the radiator 16, and thus the temperature of the activated charcoal thereof can be directly increased to a high temperature. Accordingly, by executing the above described operation (4) or (5), the temperature of the activated charcoal of the radiator 16 can be increased to a high temperature to desorb moisture therefrom.

Next, the following operation (6) is executed with respect to the capacitor 18.

(6) The compressor 54 is forcibly driven.

The operation of (6) above is the same as the operation of (3) above. By executing the above operation (6), the temperature of the condenser 18 can be increased to a high temperature to desorb moisture that is adsorbed on the activated charcoal thereof.

Thus, if an adsorbed moisture amount is determined and the moisture desorption control is executed in accordance with the activated charcoal whose temperature is to be increased to a high temperature, a decrease in the ozone purifying performance of the activated charcoal can be suppressed and the ozone purifying performance can be restored. In this case, the adsorbed moisture amount is calculated by integrating a correction value that is based on the driving history of the vehicle 10 and a correction value that is based on the execution history of moisture desorption control into a passed moisture amount that is calculated in accordance with a traveled distance of the vehicle 10. It is assumed that the ECU 60 internally stores information in which the relationship between a traveled distance and the aforementioned passed moisture amount has been previously converted into map data. Similarly, it is assumed that the ECU 60 internally stores correction values based on the aforementioned driving history, and correction values based on the history of moisture desorption control.

[Specific Processing in the Present Embodiment]

Figure 8:
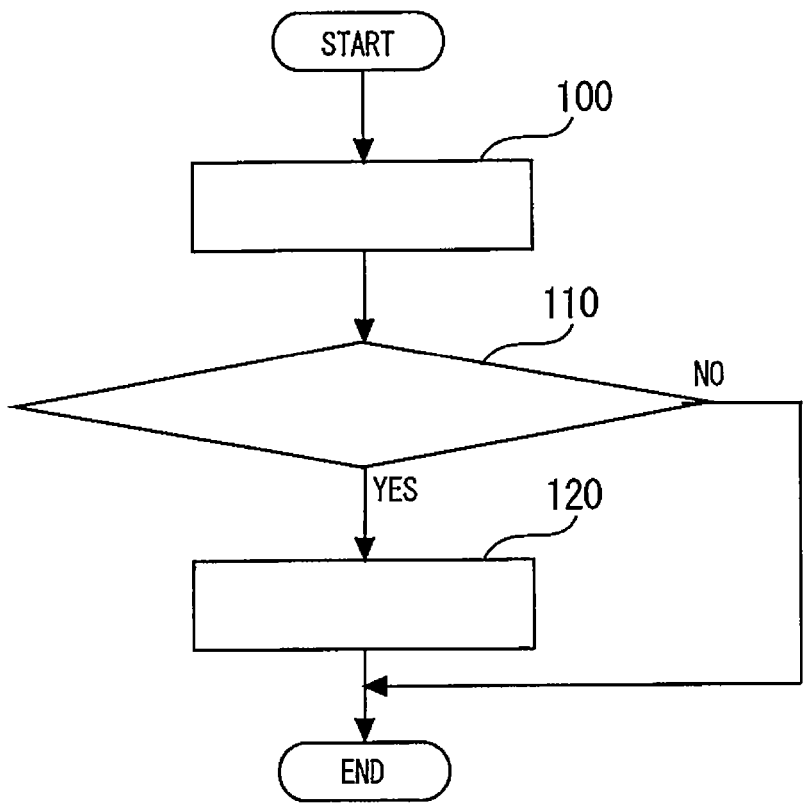
FIG. 8 is a flowchart that illustrates moisture desorption control that is executed by the ECU 60 according to the first embodiment.

Next, specific processing for implementing the above described functions is described with reference to FIG. 8. FIG. 8 is a flowchart that illustrates moisture desorption control that is executed by the ECU 60 according to the present embodiment. It is assumed that the routine shown in FIG. 8 is repeatedly executed at regular intervals.

According to the routine shown in FIG. 8, first the ECU 60 calculates an adsorbed moisture amount (step 100). Specifically, the ECU 60 applies a distance recorded on the odometer of the vehicle 10 to map data in which the relationship between traveled distances and passed moisture amounts is defined, and reads in a passed moisture amount. At the same time, the ECU 60 reads in a correction value based on the driving history as described above, and a correction value based on the moisture desorption control execution history. The ECU 60 calculates the adsorbed moisture amount based on these values.

Subsequently, the ECU 60 determines whether or not the adsorbed moisture amount calculated in step 100 is equal to or greater than a predetermined amount (step 110). If it is determined that the adsorbed moisture amount is equal to or greater than the predetermined amount, the ECU 60 controls each actuator so as to perform the aforementioned operations (1) to (6) to forcibly increase the temperature of the activated charcoal to a high temperature (step 120). In contrast, if it is determined that the adsorbed moisture amount is less than the predetermined amount, since it can be determined that it is not necessary to increase the temperature of the activated charcoal to a high temperature at the current time, the ECU 60 ends the present routine.

Thus, according to the routine shown in FIG. 8, when it is determined that the adsorbed moisture amount is equal to or greater than the predetermined amount, the temperature of the activated charcoal is forcibly increased to a high temperature to desorb moisture. Accordingly, a decrease in the ozone purifying performance of the activated charcoal can be suppressed, and the ozone purifying performance of the activated charcoal can be restored. It is thus possible to increase the lifespan of the activated charcoal and make maximum use of the ozone purifying performance thereof.

In this connection, although in the present embodiment the moisture desorption control is executed with respect to activated charcoal that is coated on core portions of the radiator 14 and the like of the vehicle 10 that is a hybrid vehicle, the moisture desorption control may also be executed for activated charcoal that is coated on another vehicle component. For example, in a common electric vehicle, a condenser is mounted for the purpose of cooling an inverter. Further, in a common fuel-cell vehicle, a radiator is mounted for the purpose of maintaining the temperature of the fuel cell within a predetermined range. Therefore, by executing moisture desorption control with respect to activated charcoal that is coated on these core portions, a decrease in the ozone purifying performance thereof can be suppressed and the like. Note that the present modification example can also be similarly applied with respect to Embodiment 2 that is described later.

Although in the present embodiment a configuration is adopted that increases the temperature of the activated charcoal of the radiator 14 and the like to a high temperature by performing the above described operations (1) to (6) as moisture desorption control, a configuration may also be adopted that, during the above described operations (1) to (6) or instead of the above described operations (1) to (6), increases the temperature of the activated charcoal of the radiator 14 and the like to a high temperature by utilizing another heat source. For example, the electric motor 36 that can utilize regenerative heat of the motor may be mentioned as another heat source. Further, a reactor, a condenser, or a battery for hybrid use that are mounted in a common hybrid vehicle can be utilized as another heat source. Furthermore, a solar battery, an electric heater for warming up an exhaust emission purifying catalyst (EHC heater), or a combustion heater may be separately mounted in the vehicle 10 and utilized as another heat source. Note that the present modification example can also be similarly applied with respect to Embodiment 2 that is described later.

Although in the present embodiment activated charcoal is used as an ozone purifying body, a porous material such as zeolite may also be used as an ozone purifying body. Further, together with the porous material, a single metal such as manganese, iron, cobalt, nickel, copper, ruthenium, rhodium, palladium, silver, platinum or gold, or a metallic complex or organometallic complex that includes one of these single metals as a core metal may also be used. These single metals, metallic complexes and organometallic complexes exhibit an ozone purifying performance that is similar to that of a porous material, and combined use thereof with a porous material is possible. Likewise, a metal oxide such as manganese dioxide may be used together with the porous material. Two or more kinds of these alternate materials may also be used simultaneously. Note that the present modification example can also be similarly applied with respect to Embodiment 2 that is described later.

In the present embodiment an adsorbed moisture amount is calculated by integrating a correction value that is based on the driving history and a correction value that is based on the execution history of moisture desorption control into a passed moisture amount that is calculated in accordance with a traveled distance of the vehicle 10. However, parameters for calculating the adsorbed moisture amount are not limited to those of the present embodiment. That is, for example, the adsorbed moisture amount may also be calculated based on an ambient temperature or an ambient humidity of the ozone purifying body. Further, for example, weather information (rainfall, snowfall), air temperature information or humidity information for the driving region may be acquired based on information of a car navigation system that is separately mounted in the vehicle 10, and the adsorbed moisture amount may be calculated based thereon. In addition, an adsorbed moisture amount may be calculated by arbitrarily combining the aforementioned calculation parameters.

Note that, in the foregoing Embodiment 1, the radiators 14 and 16 and the condenser 18 correspond to "vehicle component" in the above described first invention. In addition, in Embodiment 1, "heating means" in the above described first invention is realized by the ECU 60 executing the routine illustrated in FIG. 8.

Further, in Embodiment 1, the internal combustion engine 12 and the air conditioning system shown in FIG. 3 correspond to "heat source apparatus" in the above described second invention.

Furthermore, in Embodiment 1, the cooling water circulation circuits 24 and 26 correspond to "coolant circulation channel" in the above described third invention.

In addition, in Embodiment 1, the exhaust heat recovery device 42 corresponds to "heat recovery apparatus" in the above described fourth invention, and the heat storage circuit 44 corresponds to "heat recovery channel" in the above described fourth invention.

Embodiment 2

Configuration of Vehicle Atmosphere Purifying Apparatus

Figure 9:
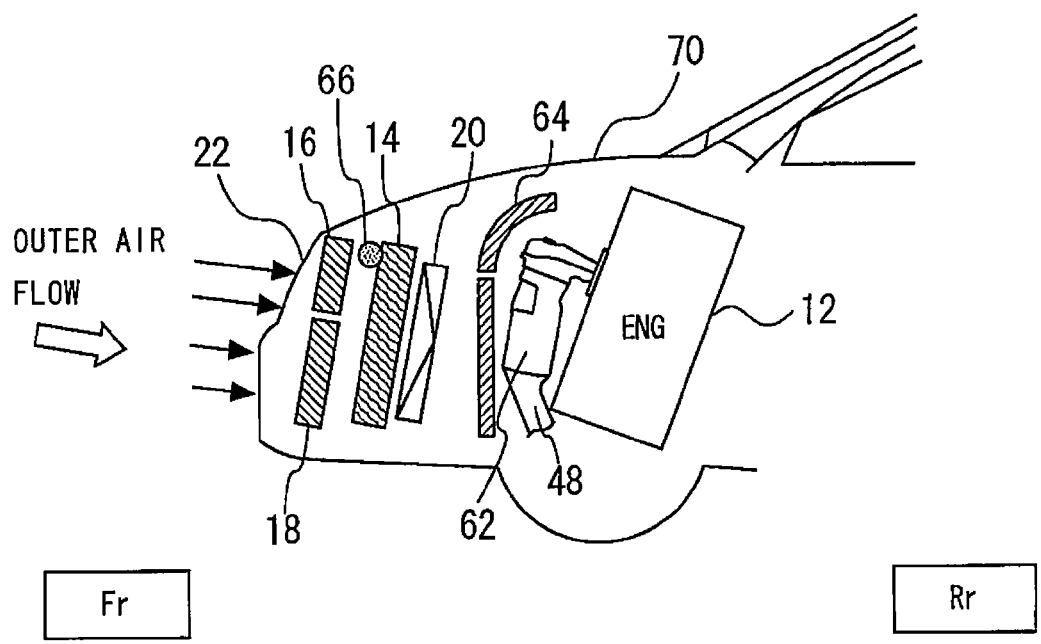
FIG. 9 is a view that illustrates the configuration of a vehicle in which an atmosphere purifying apparatus according to the second embodiment is mounted.
Figure 9:
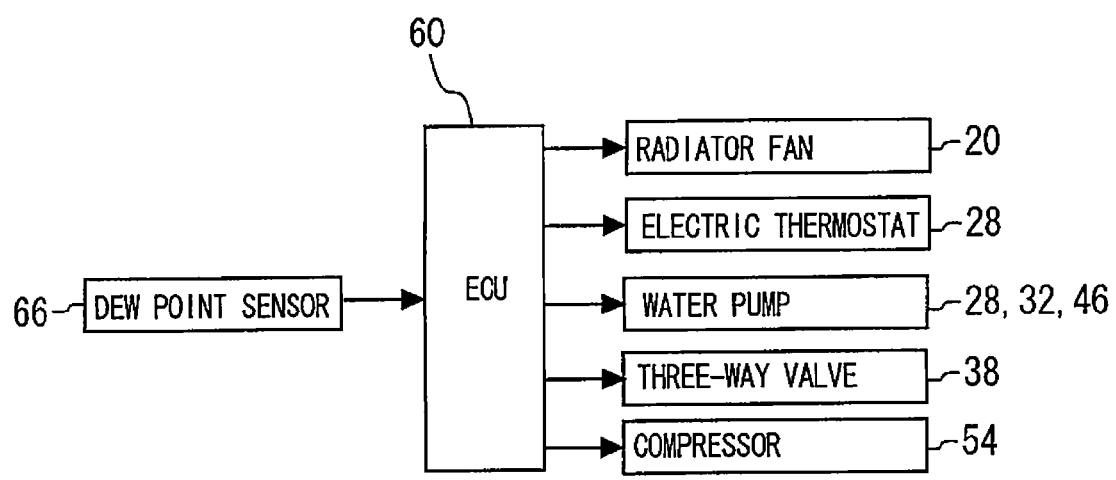
Figure 10:
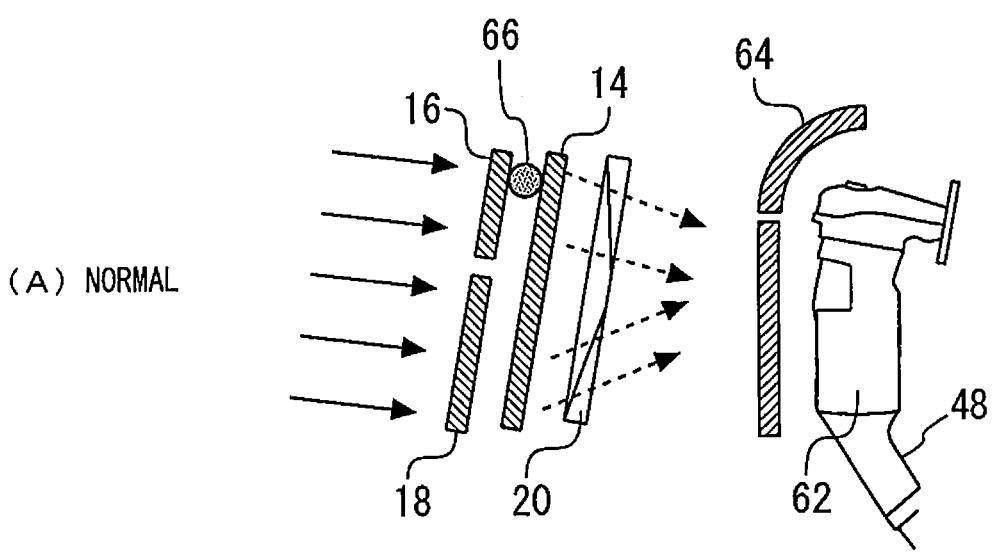
FIG. 10 is a view that illustrates moisture desorption control of the second embodiment.
Figure 10:
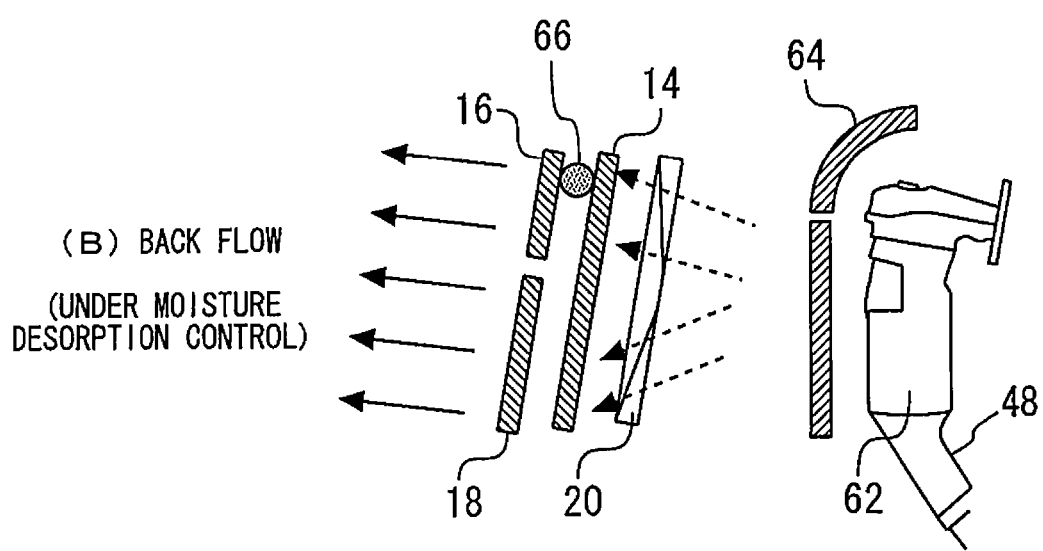

Next, Embodiment 2 of the present invention will be described referring to FIG. 9 to FIG. 11. FIG. 9 is a view that illustrates the configuration of a vehicle in which an atmosphere purifying apparatus according to the present embodiment is mounted. The basic configuration of a vehicle 70 shown in FIG. 9 is common with that of the vehicle 10 shown in FIG. 1. The configuration of the vehicle 70 differs from the configuration of the vehicle 10 shown in FIG. 1 in that a slit-shaped insulator 64 is provided between an exhaust manifold 62 of the internal combustion engine 12 and the radiator fan 20, and that a dew point sensor (hygrometer) 66 is provided between the radiator 14 and the radiator 16. It is assumed that a catalyst (not shown) that purifies exhaust gas is arranged in the exhaust manifold 62.

In the above described Embodiment 1, moisture desorption control was executed by driving the water pump 28 and electric thermostat 30 and the like. However, in a case where operations in which the vehicle 70 is stopped a short time after starting the vehicle (so-called "short-trip driving") are repeated, there is a possibility that the temperature of activated charcoal will be not increase to a high temperature during the drive cycle. Therefore, according to the present embodiment a configuration is adopted that executes moisture desorption control that rotates the radiator fan 20 in the reverse direction while the vehicle 70 is stopped, to thereby cause air around the insulator 64 to flow back to the radiator side.

In the present embodiment, the term "while the vehicle 70 is stopped" refers to a case where the vehicle 70 is under a predetermined stop condition, that is, a case where the vehicle speed and number of revolutions are equal to or less than a set value, respectively. It is assumed that these set values are previously set so as to also include a time of deceleration of the vehicle 70, in addition to a time that the vehicle 70 is completely stopped and a time when the vehicle 70 is idling (also including a time during execution of so-called "start and stop control").

The moisture desorption control in the present embodiment will now be described referring to FIGS. 10(A) and 10(B). FIG. 10(A) is a view that illustrates operations at a normal time (time of forward rotation) of the radiator fan 20, and FIG. 10(B) is a view that illustrates operations at the time of a backflow (time of reverse rotation). The radiator fan 20 rotates when cooling of the radiator 14 by means of only a running wind is insufficient. Therefore, as shown by arrows in FIG. 10(A), at a normal time the radiator fan 20 is rotated in the forward direction. In such case, air at the rear of the radiator 14 is drawn out to the insulator 64 side to thereby cool the radiator 14.

In contrast, as shown by arrows in FIG. 10(B), when the radiator fan 20 is rotated in the reverse direction, air on the insulator 64 side flows back to the radiator 14 side. Here, since the insulator 64 has a slit shape, if the air on the exhaust manifold 62 side is a higher temperature than the air on the radiator fan 20 side, the ambient air around the exhaust manifold 62 can be caused to flow to the front of the insulator 64 by a negative pressure that arises as a result of the temperature difference. Accordingly, in a state in which the exhaust manifold 62 is holding heat, ambient air around the exhaust manifold 62 can be sent to the radiator 14 by causing the radiator fan 20 to rotate in reverse. Hence, even in a situation where short-trip driving is repeated, the temperature of the activated charcoal of the radiator 14 as well as that of the radiator 16 and condenser 18 at the front of the radiator 14 can be increased to a high temperature.

The radiator fan 20 is a fan that is mounted in a common hybrid vehicle, and an amount of fuel consumed by driving thereof can be suppressed to an amount that is less than an amount of fuel consumed by driving an actuator (for example, the electric thermostat 30) of the foregoing Embodiment 1. Consequently, according to the present embodiment, not only is it possible to obtain the same effects as in Embodiment 1, but the fuel consumption can also be lowered. Further, since hot air can be sent to the entire rear face of the radiator 14 by causing the radiator fan 20 to rotate in the reverse direction, the temperature of the activated charcoal can be uniformly increased to a high temperature. Accordingly, the temperature of the activated charcoal can be increased to a high temperature more efficiently than when using a cooling water feeding method (operation in the above described (1) or (2)) in which a temperature difference arises between a cooling water inlet and a cooling water outlet of the radiator.

However, in a situation where short-trip driving is repeated, there are times when warming-up of the internal combustion engine 12 is insufficient and air inside the engine compartment remains at a low temperature. Therefore, in the present embodiment, in a case where warming-up of the internal combustion engine 12 is insufficient, the above described operations (1) to (6) are executed in addition to reverse rotation of the radiator fan 20. It is thereby possible to reliably increase the temperature of the activated charcoal to a high temperature to desorb moisture thereon.

In this connection, in the present embodiment an adsorbed moisture amount is calculated using a history of detection values of the dew point sensor 66. As described above, an airflow from the radiator 14 side to the insulator 64 side arises while the vehicle 70 is running, and an airflow in the opposite direction arises while the radiator fan 20 is rotating in the reverse direction. In this case, since moisture is also included in each airflow, the adsorbed moisture amount can be calculated by subtracting a moisture amount that is calculated based on a history of detection values during reverse rotation of the radiator fan 20 from a moisture amount calculated based on the history of detection values while the vehicle 70 is running. Therefore, use of the dew point sensor 66 makes it possible to calculate an adsorbed moisture amount with higher accuracy than in Embodiment 1 above, and thus a decrease in the ozone purifying performance can be detected at an early stage.

[Specific Processing in the Present Embodiment]

Next, specific processing for implementing the above described functions is described with reference to FIG. 11. FIG. 11 is a flowchart that illustrates moisture desorption control that is executed by the ECU 60 according to the present embodiment. It is assumed that the routine shown in FIG. 11 is repeatedly executed at regular intervals.

Figure 11:
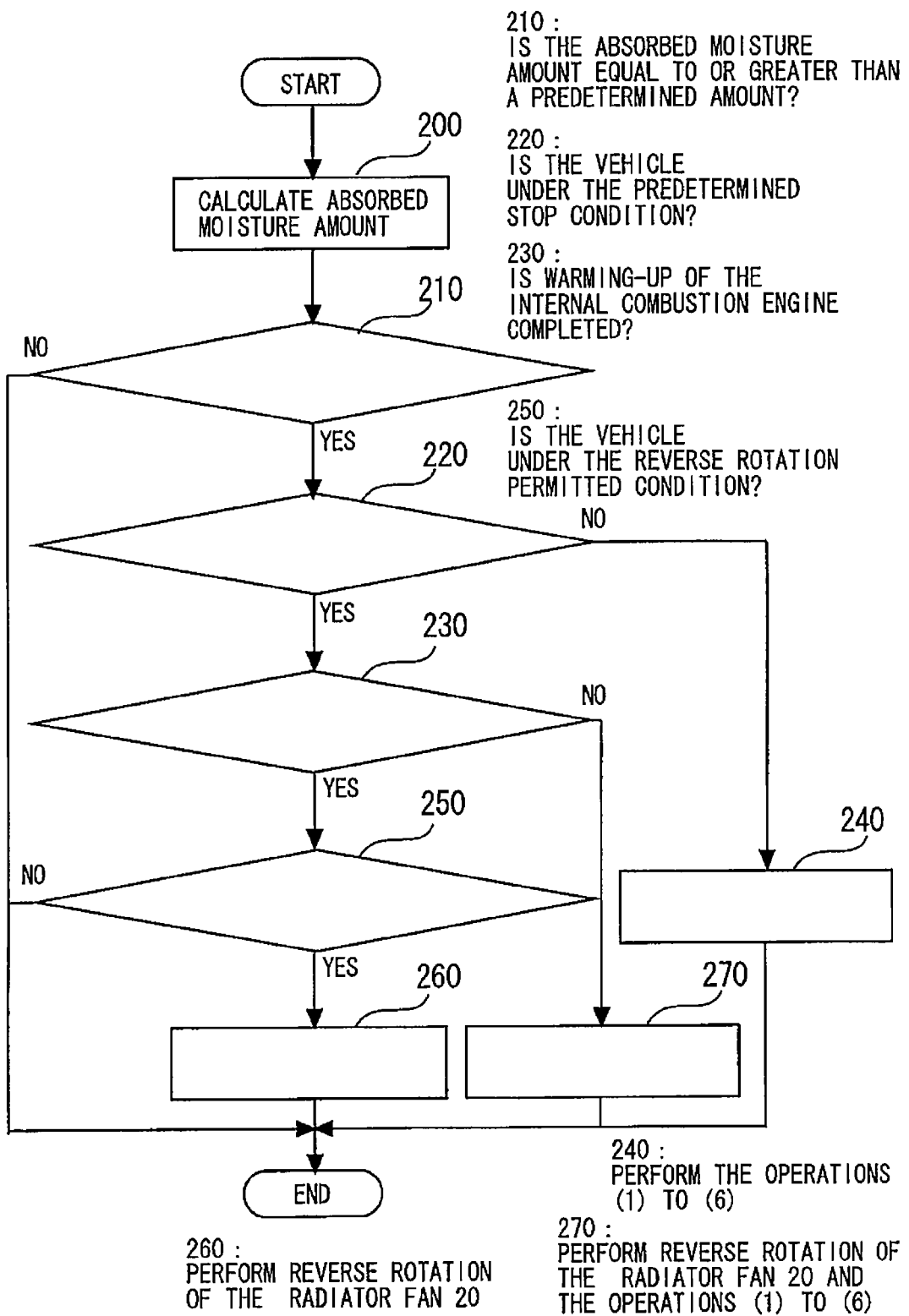
FIG. 11 is a flowchart that illustrates moisture desorption control that is executed by the ECU 60 according to the second embodiment.

According to the routine shown in FIG. 11, first the ECU 60 calculates an adsorbed moisture amount (step 200). The specific method of calculating the adsorbed moisture amount is the same as described above. Subsequently, the ECU 60 determines whether or not the adsorbed moisture amount calculated in step 200 is equal to or greater than a predetermined amount (step 210). If it is determined that the adsorbed moisture amount is equal to or greater than the predetermined amount, the ECU 60 determines whether or not the vehicle 70 is stopped (step 220). Specifically, the ECU 60 determines whether or not the vehicle is under the above described predetermined stop condition. In contrast, if it is determined in step 210 that the adsorbed moisture amount is less than the predetermined amount, the ECU 60 ends the present routine.

In step 220, if it is determined that the vehicle is under the above described predetermined stop condition, the ECU 60 determines whether or not warming-up of the internal combustion engine 12 was completed (step 230). Specifically, the ECU 60 determines whether or not warming-up was completed based on whether or not the temperature of cooling water in the cooling water circulation circuit 24 is equal to or higher than a predetermined temperature. In contrast, in step 220, if the ECU 60 determines that the vehicle is not under the above described predetermined stop condition, the operations of (1) to (6) that are described in the foregoing Embodiment 1 are executed (step 240).

In step 230, if it is determined that warming-up of the engine was completed, the ECU 60 determines whether or not the vehicle is under a reverse rotation permitted condition (step 250). Specifically, the ECU 60 determines the existence/ non-existence of a cooling-water cooling request and a residual quantity of the battery of the vehicle 70. For example, in a case where the vehicle 70 decelerates and stops after running at high speed, a cooling-water cooling request is generated to cool the internal combustion engine 12. Further, if the residual quantity of the battery of the vehicle 70 is insufficient, it is necessary to preserve the battery. Accordingly, when a cooling-water cooling request is generated or when the residual quantity of the battery is insufficient, a risk generated by reverse rotation of the radiator fan 20 is high. Therefore, the ECU 60 ends the present routine. In contrast, if it is determined that the vehicle is under the reverse rotation permitted condition in step 250, the ECU 60 causes the radiator fan 20 to perform reverse rotation (step 260).

On the other hand, in step 230, if it is determined that engine warming-up has not been completed, the ECU 60 rotates the radiator fan 20 in the reverse direction and also controls the respective actuators so as to execute the operations of (1) to (6) that are described above (step 270).

As described above, according to the routine shown in FIG. 11, when it is determined that the adsorbed moisture amount is equal to or greater than the predetermined amount, the temperature of the activated charcoal can be forcibly increased to a high temperature to desorb moisture after determining whether or not a vehicle stop condition, a warming-up completion condition, or a reverse rotation permitted condition is established. Therefore, even in a case where the temperature of the activated charcoal was not increased to a high temperature during a drive cycle, the temperature of the activated charcoal can be increased to a high temperature while the vehicle 70 is stopped to thereby desorb moisture therefrom. Accordingly, the same effects as in the foregoing Embodiment 1 can be obtained.

Although in the present embodiment, the aforementioned operations (1) to (6) are executed in addition to reverse rotation of the radiator fan 20 if warming-up of the internal combustion engine 12 is insufficient, the engine load may also be increased during the aforementioned operations (1) to (6) or instead of the aforementioned operations (1) to (6). Since the internal combustion engine 12 can be warmed up at an early stage if the engine load is increased, the temperature of the activated charcoal can be increased to a high temperature more reliably to thereby desorb moisture therefrom.

In addition, although in the present embodiment the dew point sensor 66 is provided between the radiator 14 and the radiator 16, the dew point sensor 66 may be provided between the radiator 14 and the condenser 18 or between the radiator 16 and the bumper grille 22. That is, the position at which to install the dew point sensor 66 is not particularly limited as long as the position is further to the front than the radiator 14.

Further, in the present embodiment, although the adsorbed moisture amount is calculated using a history of detection values of the dew point sensor 66, a configuration may also be adopted in which a dew point sensor other than the dew point sensor 66 is provided at the rear face of the radiator 14 and an adsorbed moisture amount is calculated using the histories of detection values of this dew point sensor and the dew point sensor 66, respectively.

Note that in the above described Embodiment 2, the radiator fan 20 corresponds to "rotary fan" in the above described fifth invention.

In addition, in Embodiment 2, "warming-up condition determination means" in the above described sixth invention is realized by the ECU 60 executing the processing in step 230 in FIG. 11.

Further, in Embodiment 2, "stop condition determination means" in the above described seventh invention is realized by the ECU 60 executing the processing in step 220 in FIG. 11.

DESCRIPTION OF REFERENCE NUMERALS 10, 70 vehicle
12 internal combustion engine
14, 16 radiator
18 condenser
20 radiator fan
24, 26 cooling water circulation circuit
28, 32, 46 water pump
30 electric thermostat
34 inverter
36 electric motor
38 three-way valve
40 heat storage tank
42 exhaust heat recovery device
44 heat storage circuit
48 exhaust passage
50 bypass passage
52 coolant circulation circuit
54 compressor
56 expansion valve
60 ECU
62 exhaust manifold
64 insulator
66 dew point sensor

The invention claimed is:

1. A vehicle atmosphere purifying apparatus comprising:
   a heat source apparatus that is mounted for at least one purpose of vehicle driving and in-vehicle air conditioning;
   a vehicle component that is arranged at a location at which a flow path of atmospheric air is formed while a vehicle is running, and has a coolant circulation channel through which first coolant that circulates inside the heat source apparatus flows;
   an ozone purifying body that is provided on the vehicle component and purifies ozone;
   a heat recovery apparatus through which second coolant flows, the second coolant recovering heat that is generated by the heat source apparatus;
   a heat recovery channel connected to the heat recovery apparatus and through which the second coolant flows;
   a valve provided between the coolant circulation channel and the heat recovery channel; and
   a controller configured to open the valve in a case where a moisture amount that is adsorbed on the ozone purifying body is equal to or greater than a preset amount, and to close the valve in a case where the moisture amount is smaller than the preset amount.

2. The vehicle atmosphere purifying apparatus according to claim 1, further comprising:
   a rotary fan that is provided between the vehicle component and the heat source apparatus;
   wherein the controller is configured to rotate the rotary fan in the case where the vehicle is under a predetermined stop condition so that air on the heat source apparatus side flows to the vehicle component side.

3. The vehicle atmosphere purifying apparatus according to claim 1, wherein:
   the controller is programmed to:
   (i) determine whether or not a predetermined warming-up condition relating to the heat source apparatus is established, and
   (ii) if it is determined that the predetermined warming-up condition is not established, open the valve to cause a flow of the first coolant to the coolant circulation channel, and if it is determined that the predetermined warming-up condition is established, close the valve to prohibit the flow of the first coolant to the coolant circulation channel.

4. The vehicle atmosphere purifying apparatus according to claim 1, wherein the controller is programmed to:
   (i) determine whether or not the adsorbed moisture amount is equal to or greater than a predetermined amount;
   (ii) determine whether or not a predetermined stop condition relating to the vehicle is established; and
   (iii) if it is determined that the adsorbed moisture amount is equal to or greater than the predetermined amount and the predetermined stop condition is not established, open the valve.

5. The vehicle atmosphere purifying apparatus according to claim 1, wherein the controller is programmed to calculate the moisture amount based on at least one of a traveled distance of the vehicle, a vehicle driving history of the vehicle, a heating history of the ozone purifying body, an ambient temperature of the ozone purifying body, an ambient humidity of the ozone purifying body, weather information of a driving region, air temperature information of the driving region, and humidity information of the driving region.

* * * * *